No. 641,617. Patented Jan. 16, 1900.
J. E. THORNYCROFT.
FASTENING OF CONDENSER TUBES.
(Application filed June 29, 1899.)
(No Model.)

Attest:
A. V. Bourke
F. C. Van Cott.

Inventor
John E. Thornycroft
By Philipp Phelps Sawyer
Attys

THE NORRIS PETERS CO., PHOTO-LITHO., WASHINGTON, D. C.

UNITED STATES PATENT OFFICE.

JOHN EDWARD THORNYCROFT, OF LONDON, ENGLAND.

FASTENING OF CONDENSER-TUBES.

SPECIFICATION forming part of Letters Patent No. 641,617, dated January 16, 1900.

Application filed June 29, 1899. Serial No. 722,242. (No model.)

*To all whom it may concern:*

Be it known that I, JOHN EDWARD THORNYCROFT, a subject of the Queen of Great Britain and Ireland, residing at Chiswick, London, in the county of Middlesex, England, have invented Improvements in the Fastening of Condenser-Tubes, of which the following is a specification.

It is usual to fasten the tubes in the tube-plates of condensers by the use of externally-threaded ferrules that surround the tube ends and are screwed into correspondingly-threaded holes in the tube-plates, those inner portions of the ferrules that surround the tubes being of larger internal diameter than their outer ends, so as to form shoulders that overlap the tube ends, and the inner portions of the holes in the tube-plates being made of reduced diameter, so as to form shoulders between which and the beveled inner ends of the ferrules suitable packing, such as tape, is introduced. It is, however, found that in practice, owing to the great vibration to which the condensers are subject, the ferrules are liable to gradually work back and so to allow the packing to work loose, leading to side play of the tubes and consequent leakage; and my invention is intended to obviate or mitigate this evil, for which purpose according thereto the ferrules are at their inner ends formed with slits (for example, saw cuts) or nicks, and the ferrules are by screwing their beveled ends against the packing caused to lock themselves in place or to offer increased resistance to becoming unscrewed, and the tubes are thus more securely fixed.

Figure 1:
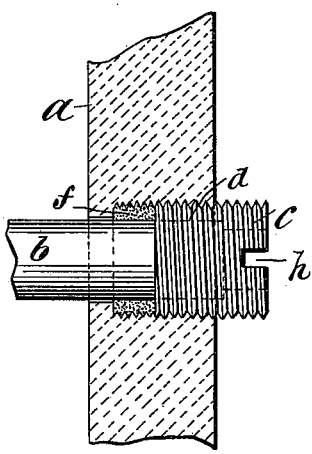
Figure 2:
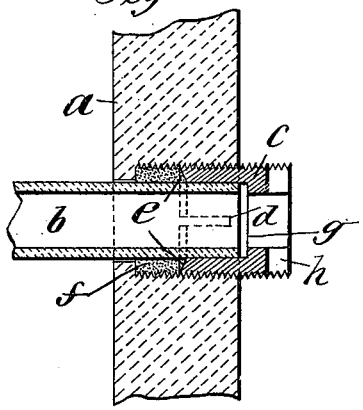
Figure 3:
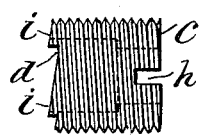
Figure 4:
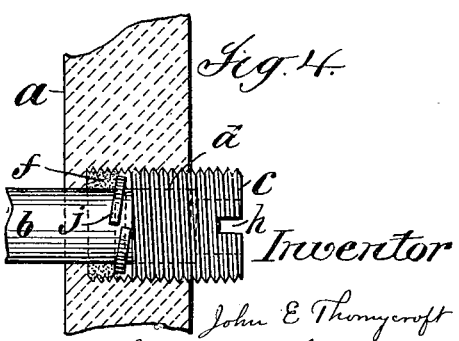

Referring to the accompanying drawings, Figure 1 is a section through a piece of tube-plate, showing a tube with ferrule fastened therein according to this invention. Fig. 2 is a somewhat similar view, but shows the ferrule in longitudinal section. Fig. 3 is a side elevation of a modified form of ferrule.

Referring to Figs. 1 and 2, $a$ is the tube-plate, $b$ the tube, and $c$ the externally-screw-threaded ferrule, formed with slits or nicks, such as saw cuts, one of which is shown at $d$, extending backwardly from its inner end; but there may be only one or there may be more than two slits or nicks and the forms thereof may be varied. The inner end of the ferrule is beveled on its inner edge at $e$. $f$ is packing material, such as tape, and $g$ is the internal shoulder of the ferrule, which when the packing $f$ has been compressed should be slightly clear of the tube end. $h$ is a short slit or nick to receive the screwing-in tool. Such ferrules are, by screwing their beveled edges against the packing, expanded or spread out, so as to cause their screw-threads to bite into those of the tube-plate, the packing entering and forming a hard packing within the slits or nicks. An automatic lock is thus established between the ferrule and the packing. Displacement of the ferrule by vibration is thus prevented or retarded, an efficient fluid-tight joint to the tube at the same time being insured.

In the arrangement shown in Fig. 3 instead of forming slits or nicks of considerable length the ferrule end is formed with a series of one or more short slits or nicks $d$, those portions of the ferrule end between every two slits or nicks forming teeth $i$, which may be of ratchet-like form, and which while allowing the ferrule to be screwed in tightly by engaging with the packing $f$, tend to prevent the ferrule becoming unscrewed.

With slits or nicks such as just described narrow slits or nicks such as those represented in Figs. 1 and 2 may be combined.

What I claim is—

1. In a condenser-tube fastening a ferrule provided with means for securing it to the tube-sheet and having its inner end slit or nicked as set forth.

2. In a condenser-tube fastening a ferrule provided with means for securing it to the tube-sheet and having its inner end slit or nicked and beveled at the inner edge as set forth.

3. In a condenser-tube fastening a ferrule externally screw-threaded and having its inner end slit or nicked as set forth.

4. In a condenser-tube fastening a ferrule externally screw-threaded and having its inner end slit or nicked and beveled at the inner edge as set forth.

5. In a condenser-tube fastening a ferrule screw-threaded externally, formed with an internal shoulder to bear against the tube end and having its inner end slit or nicked as set forth.

6. In a condenser-tube fastening a ferrule screw-threaded externally, formed with an internal shoulder to bear against the tube end and having its inner end slit or nicked and beveled at the inner edge as set forth.

7. In a tube-fastening device, the combination with the tube-plate having a perforation therethrough to receive the tube, of a flexible packing surrounding the tube, a ferrule for securing the tube in position said ferrule being provided with means for securing it to the tube-sheet, and means whereby an automatic lock is established between the packing and the ferrule when the ferrule is forced into position, substantially as described.

8. In a condenser the combination for fastening a tube end of the tube-plate of the condenser having a hole to receive said tube end, said hole being formed with a screw-threaded part of enlarged diameter and with a shoulder, packing surrounding the tube end in proximity to said shoulder and a ferrule externally screw-threaded, formed internally with a shoulder and having its inner end slit or nicked, said ferrule being screwed into said screw-threaded hole so as to surround the tube end, to bear with its shoulder against the end of the tube and to compress the packing between the inner end of the ferrule and the shoulder of the tube-plate so as to cause the said ferrule to lock itself in place as set forth.

9. In a condenser the combination for fastening a tube end of the tube-plate of the condenser having a hole to receive said tube end, said hole being formed with a screw-threaded part of enlarged diameter and with a shoulder, packing surrounding the tube end in proximity to said shoulder and a ferrule externally screw-threaded, formed internally with a shoulder and having its inner end slit or nicked and beveled at the inner edge, said ferrule being screwed into said screw-threaded hole so as to surround the tube end, to bear with its shoulder against the end of the tube and to compress the packing between the inner end of the ferrule and the shoulder of the tube-plate so as to cause the said ferrule to lock itself in place as set forth.

Signed at 77 Cornhill, in the city of London, England, this 15th day of June, 1899.

JOHN EDWARD THORNYCROFT.

Witnesses:
EDMUND S. SNEWIN,
WM. O. BROWN.